(12) United States Patent
Frishman et al.

(10) Patent No.: US 7,706,627 B2
(45) Date of Patent: **\*Apr. 27, 2010**

(54) METHOD FOR REDUCING BLOCKING ARTIFACTS

(75) Inventors: Eyal Frishman, Kfar-Sava (IL); Tamir Sagi, Haifa (IL); Noam Oren, Herzeliya (IL)

(73) Assignee: Zoran Corporation, Sunnyvale, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/185,807

(22) Filed: Aug. 4, 2008

(65) Prior Publication Data

US 2009/0028459 A1    Jan. 29, 2009

Related U.S. Application Data

(63) Continuation of application No. 10/234,395, filed on Sep. 5, 2002, now Pat. No. 7,426,315.

(60) Provisional application No. 60/316,963, filed on Sep. 5, 2001.

(51) Int. Cl.
*G06K 9/40* (2006.01)

(52) U.S. Cl. ............ 382/268; 382/232; 382/275; 348/403.1; 348/420.1; 348/607; 358/463; 375/240.24; 375/240.27; 375/240.29

(58) Field of Classification Search ............ 382/268
See application file for complete search history.

(56) References Cited

U.S. PATENT DOCUMENTS

| | | | |
|---|---|---|---|
| 5,220,616 A | 6/1993 | Downing et al. | |
| 5,473,384 A | 12/1995 | Jayant et al. | |
| 5,590,064 A | 12/1996 | Astle | |
| 5,677,736 A | 10/1997 | Suzuki et al. | |
| 5,719,958 A | 2/1998 | Wober et al. | |
| 5,737,455 A | 4/1998 | Harrington et al. | |
| 5,757,982 A | 5/1998 | Tepmongkol | |
| 5,796,875 A | 8/1998 | Read | |
| 5,802,218 A | 9/1998 | Brailean | |
| 5,835,618 A | 11/1998 | Fang et al. | |
| 5,852,475 A | 12/1998 | Gupta et al. | |
| 5,933,541 A | 8/1999 | Kutka et al. | |

(Continued)

OTHER PUBLICATIONS

"ITU-T Recommendation H.263", Series H: Audiovisual and Multimedia Systems; Infrastructure of Audiovisual services—Coding of Moving Video, *Video Coding for Low Bit Rate Communication*, International Telecommunication Union, Jan. 2005, title page, pp. 80-84.

(Continued)

*Primary Examiner*—Sath V Perungavoor
(74) *Attorney, Agent, or Firm*—Darby & Darby PC; John W. Branch

(57) ABSTRACT

A method for removing blocking artifacts from moving and still pictures, comprising classifying horizontal and vertical boundaries in each picture as blocky or non-blocky; for each blocky boundary, defining an adaptive, picture contentdependent, one-dimensional filtered pixels region of interest (ROI) that crosses the boundary and is bound at each of its ends by a bounding pixel; defining a finite filter having a length correlated with the length of the ROI; defining a filtering pixels expansion that uniquely determines the padding values of the finite length filtered pixels ROI for the finite length filtering; and filtering the ROI pixels using the finite filter and the filtering expansion.

43 Claims, 8 Drawing Sheets

U.S. PATENT DOCUMENTS

| | | | |
|---|---|---|---|
| 6,016,365 A | 1/2000 | Shin et al. | |
| 6,028,967 A | 2/2000 | Kim et al. | |
| 6,151,420 A | 11/2000 | Wober et al. | |
| 6,167,164 A | 12/2000 | Lee et al. | |
| 6,188,799 B1 | 2/2001 | Tan et al. | |
| 6,215,425 B1 | 4/2001 | Andrews et al. | |
| 6,236,764 B1 | 5/2001 | Zhou | |
| 6,240,135 B1 | 5/2001 | Kim et al. | |
| 6,285,801 B1 | 9/2001 | Mancuso et al. | |
| 6,320,905 B1 | 11/2001 | Konstantinides | |
| 6,360,024 B1 | 3/2002 | Tan et al. | |
| 6,504,873 B1 | 1/2003 | Vehvilainen et al. | |
| 6,529,638 B1 | 3/2003 | Westerman | |
| 6,600,839 B2 | 7/2003 | Mancuso et al. | |
| 6,724,944 B1 | 4/2004 | Kalevo et al. | |
| 6,741,752 B1 | 5/2004 | Yang et al. | |
| 6,748,113 B1 | 6/2004 | Kondo et al. | |
| 6,993,191 B2 | 1/2006 | Petrescu | |
| 7,239,755 B1 | 7/2007 | Kim et al. | |
| 7,426,315 B2 * | 9/2008 | Frishman et al. | 382/268 |
| 7,539,248 B2 * | 5/2009 | Kwon et al. | 375/240.24 |
| 2001/0017944 A1 | 8/2001 | Kalevo et al. | |
| 2003/0020835 A1 * | 1/2003 | Petrescu | 348/625 |
| 2003/0021489 A1 | 1/2003 | Miura et al. | |
| 2003/0044080 A1 | 3/2003 | Frishman et al. | |
| 2003/0053708 A1 | 3/2003 | Kryukov et al. | |
| 2003/0053711 A1 | 3/2003 | Kim | |
| 2003/0103680 A1 | 6/2003 | Westerman | |
| 2003/0138154 A1 | 7/2003 | Suino | |
| 2004/0146210 A1 | 7/2004 | Kalevo et al. | |
| 2005/0196063 A1 | 9/2005 | Guangxi et al. | |
| 2005/0243911 A1 | 11/2005 | Kwon et al. | |
| 2005/0243912 A1 | 11/2005 | Kwon et al. | |
| 2005/0243913 A1 | 11/2005 | Kwon et al. | |
| 2005/0243914 A1 | 11/2005 | Kwon et al. | |
| 2005/0243915 A1 | 11/2005 | Kwon et al. | |
| 2005/0243916 A1 | 11/2005 | Kwon et al. | |
| 2005/0244063 A1 | 11/2005 | Kwon et al. | |
| 2005/0276505 A1 | 12/2005 | Raveendran | |
| 2008/0043854 A1 | 2/2008 | Kim et al. | |
| 2008/0069472 A1 | 3/2008 | Kim et al. | |

OTHER PUBLICATIONS

Cahill, B. et al., "Locally Adaptive Deblocking Filter for Low Bit Rate Video," Image Processing, 2000. Proceedings. 2000 International Conference on, 2000, INSPEC Accession No. 6998697.

Cheung, W.F. et al., "Optimizing MPEG-4 Coding Performance by Taking Post-Processing into Account," Image Processing, 2000. Proceedings. 2000 International Conference on, 2000, ISBN: 0-7803-6297-7.

Kim, N.C. et al., "Reduction of Blocking Artifact in Block-Coded Images using Wavelet Transform," Circuits and Systems for Video Technology, IEEE Transactions on, 1998, ISSN: 1051-8215.

Kim, S.D. et al., "A Deblocking Filter with Two Separate Modes in Block-Based Video Coding," Circuits and Systems for Video Technology, IEEE Transactions on, 1999, ISSN: 1051-8215.

Lee, Y.L. et al., "Loop filtering and post-filtering for low-bit-rates moving picture coding," Signal processing: Image Communication 16, 2001, pp. 871-890.

Paek, H. et al., "A DCT-Based Spatially Adaptive Post-Processing Technique to Reduce the Blocking Artifacts in Transform Coded Images," Circuits and Systems for Video Technology, IEEE Transactions on, 2000, ISSN: 1051-8215.

* cited by examiner

A

B

METHOD FOR REDUCING BLOCKING ARTIFACTS

CROSS-REFERENCE TO RELATED APPLICATIONS

This is a Continuation Application of U.S. patent application Ser. No. 10/234,395, filed on Sep. 5, 2002 which claims priority to U.S. Provisional Application No. 60/316,963 filed Sep. 5, 2001, which is based on and claims priority under 35 U.S.C 119(e).

FIELD AND BACKGROUND OF THE INVENTION

The present invention relates to a method for reducing blocking artifacts. The invention is useful for removing blocking artifacts from still pictures or moving pictures that were reconstructed according to any coding scheme that introduce blocking artifacts. The invention provides a robust and picture-content dependent solution for removing the blocking artifact without reducing the quality or sharpness of the processed picture, and may be implemented efficiently in software and in hardware.

In Block-Based video coding (such as the ISO standards MPEG1, MPEG2, MPEG4 and JPEG, and ITU standards H.261 and H.263) each picture in the video sequence is partitioned into blocks of N×N pixels, (specifically 8×8 pixels in the MPEG/JPEG compression family and in H.263/H.261), and each block is then coded independently. When the bits-budget for the encoding is limited, a single block may be assigned with fewer bits than required for its representation ("lossy compression"). Since most popular block-based techniques are Discrete Cosine Transform (DCT) based, it is common that the deprived data is the data related to higher spatial frequency. In the extreme case of Very Low Bit rate (VLB) coding, most of the bits are allocated to the mean pixel value of the block, and only a few are allocated to the higher frequency variations. As a result, the continuity between adjacent blocks is broken. This discontinuity at the block boundaries presents an annoying artifact known as the Blocking Artifact. FIG. 1 illustrates the blocking problem: (A)—an original picture, and (B) a reconstructed (encoded/decoded) picture. The picture in (B) clearly shows the blocking artifact.

Existing methods to reduce this blocking artifact, as described for example in "Method of Removing Blocking Artifacts in a Coding System of a Moving Picture", U.S. Pat. No. 6,240,135 to Kim et. al., (hereinafter "Kim '135") is unsatisfactory. Other, equally unsatisfactory prior art methods dealing with the subject include ITU H.263 recommendation Annex J: Deblocking filter mode, U.S. Pat. No. 6,028,967, to Kim, U.S. Pat. No. 6,188,799 to Tan, U.S. Pat. No. 6,151,420 to Wober, U.S. Pat. No. 6,236,764 to Zhou, U.S. Pat. No. 6,215,425 to Andrews, U.S. Pat. No. 5,677,736 to Suzuki, U.S. Pat. No. 5,933,541 to Kutka, and U.S. Pat. No. 5,802,218 to Brailean. The Kim '135 patent, assigned to LG Electronics Inc. (hereinafter "the LG method") is the most relevant to this disclosure, and is discussed in more detail below.

Kim '13 5 considers 5 pixels from each side of a block boundary. An absolute difference is then calculated between each two neighbors (9 pairs). If the absolute difference is larger than a threshold, a "0" is accumulated to a counter, while if it is smaller than the same threshold, a "1" is accumulated to the counter. The outcome is a number between 0 and 9. This is in effect a kind of an "inverse activity" measure over the boundary and into the depth of the block on each side. This inverse activity type of measure serves to decide between two methods ("modes") of processing:

I. a Default mode (that will in effect change only the 2 boundary pixels), which is operative when the "inverse activity" is small (e.g. in case of textured data).

II. a DC mode, which is operative when the "inverse activity" is large (the area is more or less smooth, with maybe one edge inside it). In the DC mode there are two options: 1) if the difference between the minimal pixel and the maximal pixel in the region of 4 pixels to the left of the boundary and 4 pixels to the right is large (larger or equal to twice the quantization scale (QS) factor of the treated block) then nothing is done (since the algorithm deduces that the blocking artifact is not severe). However, this may be also the case when the blocking artifact is severe and there is also an edge in the 8 pixels region, so that this lack of action is actually a disadvantage. 2) if the difference is small (smaller than twice the QS factor of the treated block) then the entire region of interest (ROI) of the eight pixels is smoothed with a constant filter (since the algorithm deduces that the blocking artifact is severe).

The disadvantages of the LG method become clear when considering the following examples. In the first example (Case "A"), consider a block with a visible and solid block boundary, having a large single high edge within the block (a very common case in natural pictures divided to 8×8 blocks). In such a case, the LG method chooses the DC mode (II). Within the DC mode option I is chosen and no filtering is performed, i.e. the LG method will not filter the visible block boundary of this block. In another, similar example (Case "B"), consider a block in which the edge is not too high, i.e. it is a mild edge. In this case the LG method will also choose the DC mode, but in this case option 2 is chosen and filtering is performed. That is, the LG method will filter the visible block boundary of this block, but will also filter a real edge (that will affect its neighborhood since the LG method use a 9 taps filter in this case).

In a second example (Case "C"), consider a block with a visible and solid block boundary and two edges (one on each side of the boundary). In this case, the LG method will choose the Default mode (I). In the default mode, the LG method will change the value of the 2 pixels that cross the block boundary. The problem here is that the LG method is not exploiting the possibility to smooth deeper into the block, even if the edges are far away from the boundary (say at ±3 pixels from the boundary).

Yet another fault of the LG algorithm (as disclosed in the LG method) is that it is not robust to changes in the threshold against which the absolute differences are evaluated. There are no numerical values for the threshold in the prior art LG patent above (Kim '13 5), and the examples used above assumed the most logical values, taken from the MPEG4 standard in which the LG algorithm is presented with numerical values. If the threshold is changed to a smaller number, then Case "A" above becomes frequent, and the algorithm will produce poor results. If the threshold is changed to a larger number, then the DC mode (II) becomes irrelevant (it will not be activated). Therefore, the LG method is not robust.

There is thus a widely recognized need for, and it would be highly advantageous to have, a low cost implementation, general use, accurate de-blocking filter aimed at reducing the blocking artifact.

SUMMARY OF THE INVENTION

The present invention is of a method for reducing blocking artifacts. The method presented herein can remove blocking artifacts from pictures that were, for example, compressed using one of the compression methods mentioned above. A major advantage of the method disclosed herein is an adaptive choice of a filtered pixels region of interest (ROI). The population of pixels that undergo filtering is adaptively chosen as an integral part of the invention. The adaptation is defined in a way such that edges in the content of the picture are not smoothed out by the method, which, in essence, is a low pass filtering method due to the nature of the problem it solves. The method uniquely treats bounding conditions for finite length filtering so that no artifacts are introduced by it. It also detects areas in the picture content that are smooth, and uses an aggressive filter for better smoothing of blocking artifacts in such areas. As a result, the quality and sharpness of the picture are not reduced by applying this method to blocky pictures.

The method presented herein can be performed on a reconstructed picture, used as a post-processing operation in order to improve and enhance picture quality, or used as an inloop operation in order to enhance image quality and improve the process of estimating motion within the compression loop.

According to the present invention there is provided a method for removing blocking artifacts from moving and still pictures, each picture composed of blocks defined by horizontal and vertical block boundaries, the method comprising the steps of: in each picture, classifying the horizontal and vertical boundaries as blocky or non-blocky; for each classified blocky boundary, defining an adaptive, picture content-dependent, one-dimensional filtered pixels region of interest (ROI) having two ends and bound at each end by a bounding pixel, the ROI including a first plurality of concatenated, adjacent pixels to be filtered, the ROI crossing the blocky boundary; defining a finite filter with a length correlated with the first plurality of concatenated, adjacent pixels of the ROI; defining a filtering pixels expansion having a second one dimensional plurality of pixels, the second plurality including the first plurality of pixels; and filtering the first plurality of pixels using the finite filter and the filtering expansion.

According to one feature of the method of the present invention, the ROI is symmetric.

According to another feature of the method of the present invention, the ROI is asymmetric.

According to the present invention, in a preferred embodiment of the method the classifying includes classifying boundaries spaced apart from each other by 8 pixels.

According to a feature in the preferred embodiment of the method of the present invention, the classifying further includes assigning the value of each pixel of a boundary pixel-duo P8 and P9, the boundary pixel-duo included in the first pixel plurality and straddling the block boundary, choosing a multiplier M and a receiving a quantization scale parameter QS, and classifying the block boundary as blocky if IP8-P9J<(M*QS).

According to another feature in the preferred embodiment of the method of the present invention, the definition of an adaptive one-dimensional filtered pixels ROI includes: for each blocky boundary, assigning four pixel values P5, P6, P7, P8 of adjacent pixels residing on a left side for a vertical boundary and on a top side for a horizontal boundary and four pixel values P9, Pto, $P_{11}$, $P_{12}$ of adjacent pixels residing on a right side for a vertical boundary and on a bottom side for a horizontal boundary, providing a threshold Threshold.1, and running an iterative cycle comparing absolute value differences between each adjacent pixel pair on each side of the boundary and Threshold 1.

According to yet another feature in the preferred embodiment of the method of the present invention, the comparison of absolute value differences includes, iteratively: checking if JPx−PX−1j<_Threshold_1 wherein X is successively 8, 7 and 6 and, if true, including each $P_{x\_}1$ in the filtered pixels ROI, the ROI bound with $P_5$ as a bounding pixel, else using Px as the bounding pixel to bound the ROI on the left side for a vertical block boundary and on the top side for a horizontal block boundary; and checking if JPx−Px+1J<Threshold.1 wherein X is successively 9, 10 and 11 and, if true, including each Px+i in the filtered pixels ROI, the ROI bound with $P_1$2 as a bounding pixel, else using $P_x$ as a right bounding pixel for a vertical block boundary and as a bottom bounding pixel for a horizontal block boundary to bound the ROI on right side for a vertical boundary and on the bottom side for a horizontal boundary.

According to yet another feature in the preferred embodiment of the method of the present invention, the definition of a finite filter further includes: if the filtered pixels ROI 30 includes 8 pixels P5 to $P_{12}$, defining the filter as Filter 1 where Filter.I=[ho, h1, h2, h3, h4, $h_5$, h6, h7, h8], and if the filtered pixels ROI includes less then 8 pixels, defining the filter as Filter.2 where Filter.2=[$h_o$, ht, h2, h3, h4].

According to yet another feature in the preferred embodiment of the method of the present invention, the definition of a filtering pixel expansion includes: receiving as input the bounding pixel of the filtered pixels ROI, the bounding pixel value obtained in the checking, receiving as input a pixel adjacent to the bounding pixel, the adjacent pixel residing outside the filtered pixels ROI, providing a threshold Threshold 2, and calculating an absolute graylevel difference between the bounding pixel and the adjacent pixel, and comparing the absolute gray-level difference with Threshold 2.

According to yet another feature in the preferred embodiment of the method of the present invention, the comparison of the absolute gray-level difference with Threshold 2 further includes, for a vertical block boundary: checking if $_{IPLB}$−PLB_1I<Threshold 2 where Pt,B−1 is the pixel immediately adjacently to the left of PLB and $P_{LB}$ is the left bounding pixel, and if true using the value of $_{PLB-1}$ for the expansion, else using the value of $P_L$B for the expansion, and checking if $_{JPRB-PRB+}$1I<Threshold 2, where PRB+I is the pixel immediately adjacently to the right of $P_{RB}$ and PRB is the right bounding pixel, and if true, using the value of $P_{RB+1}$ for the expansion, else using the value of $P_{RB}$ for said expansion.

According to yet another feature in the preferred embodiment of the method of the present invention, the comparison of the absolute gray-level difference with Threshold 2 further includes, for a horizontal block boundary: checking if JPTB−PTB−1I: Threshold.2 where $_{PTB-1}$ is the pixel immediately adjacently above $P_{TB}$ and PTB is the top bounding pixel, and if true, using the value of $_{PTB\_i}$ for the expansion, else using the value of PTB for the expansion, and checking if JPBB−PBB+11−<Threshold 2, where $_{PBB+1}$ is the pixel immediately adjacently below PBB and $P_{BB}$ is the bottom bounding pixel, and if true, using the value of $_{PBB+1}$ for the expansion, else using the value of $P_{BB}$ for the expansion.

According to yet another feature in the preferred embodiment of the method of the present invention, the filtering of the filtered pixels ROI using Filter _I and the filtering pixels expansion includes: padding four values to each side of the one-dimensional filtered pixels ROI using the filtering pixels expansion values, and filtering the one-dimensional filtered pixels ROI using Filter 1.

According to yet another feature in the preferred embodiment of the method of the present invention, the filtering of the filtered pixels ROI using Filter 2 and the filtering pixels expansion includes: padding two values to each side of the one-dimensional filtered pixels ROI using the filtering pixels expansion values, and filtering the one-dimensional filtered pixels ROI using Filter 2.

BRIEF DESCRIPTION OF THE DRAWINGS

The invention is herein described, by way of example only, with reference to the accompanying drawings, wherein:

FIGS. 9A and 9C—pictures encoded at 40 KBPS/10 FPS: FIGS. 9B and 9D—pictures after using the de-blocking method described herein.

DESCRIPTION OF THE PREFERRED EMBODIMENTS

The present invention is of a method for reducing blocking artifacts. In the following description, we will refer to 8×8 pixel blocks, with the understanding that the method described is equally applicable to any N×N block based compression. The method presented herein can remove blocking artifacts from pictures that were, for example, compressed using one of the compression methods mentioned above. The method presented herein can be performed on a reconstructed picture, used as a post-processing operation in order to improve and enhance picture quality, or used as an in-loop operation in order to enhance image quality and improve the process of estimating motion within the compression loop.

The principles and operation of a method for reducing blocking artifacts according to the present invention may be better understood with reference to the drawings and the accompanying description.

Figure 1:
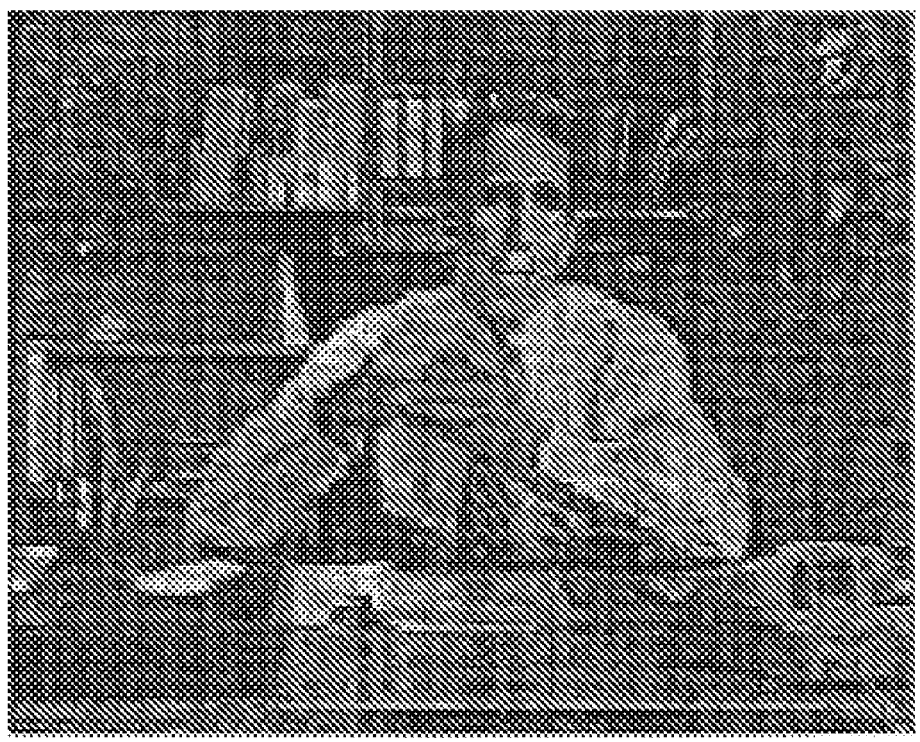
FIG. 1 illustrates the blocking artifact: A—an original picture, B—a reconstructed (encoded/decoded) picture.
Figure 1:
Figure 2:
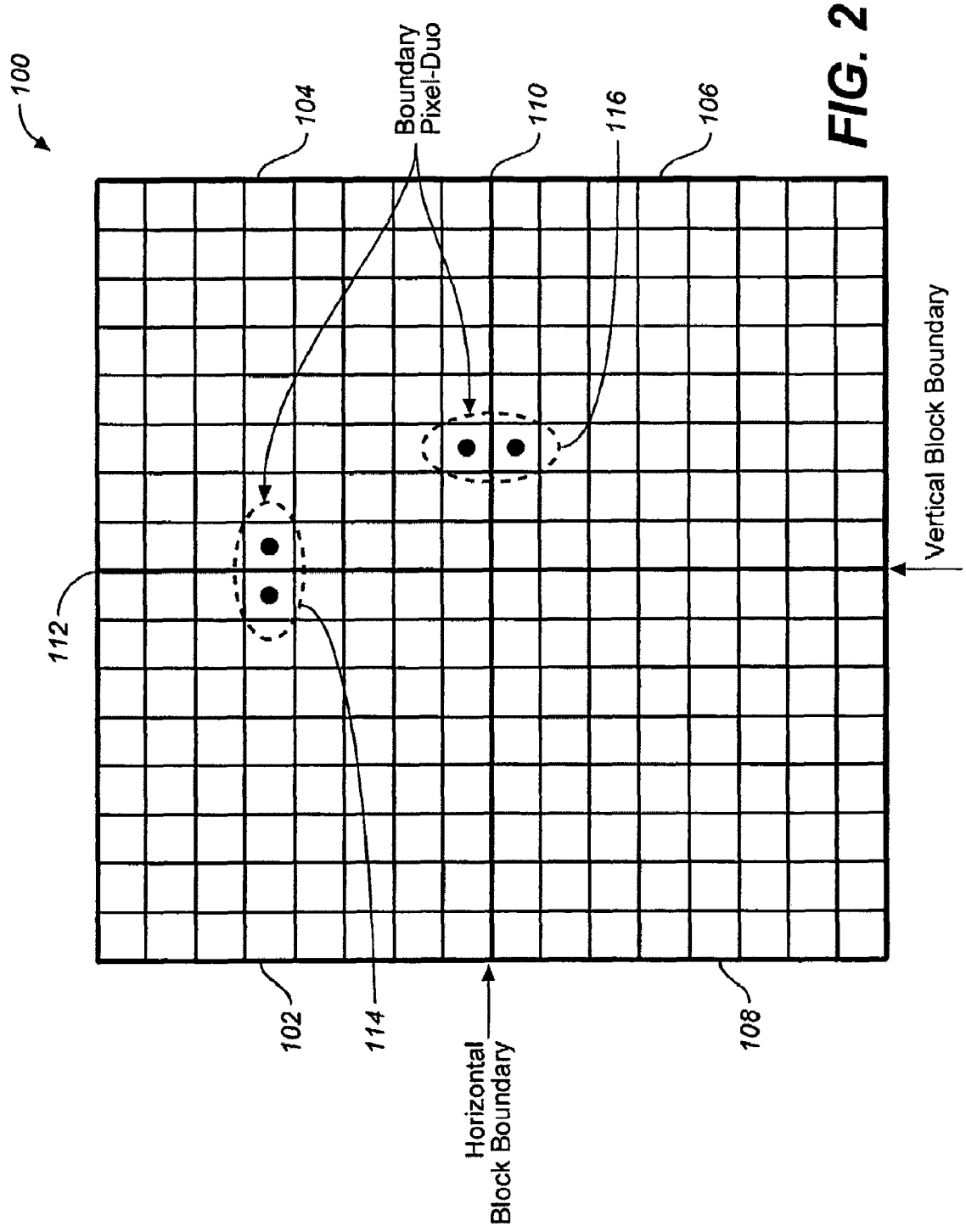
FIG. 2 shows visualization of definitions: vertical block boundary, horizontal block boundary and boundary pixel-duo.

Referring now to the drawings, FIG. 2 shows some of the definitions used in the following description. FIG. 2 shows a picture area 100 formed of four blocks 102, 104, 106, and 108. Each of the four blocks shown includes 64 pixels. A horizontal block boundary 110 separates top blocks 102 and 104 from bottom blocks 106 and 108. A vertical block boundary 110 separates left blocks 102 and 108 from right blocks 104 and 106. A pair of pixels residing on opposite sides of a boundary e.g. pixel pairs 114 and 116 are defined a Boundary PixelDuo. The method is performed on all block boundaries of a block-decoded picture, preferably first over the horizontal boundaries (i.e. from top to bottom or from bottom to top in FIG. 2), and then on the vertical boundaries (i.e. from left to right or from right to left in FIG. 2). The most preferred sequence is to operate the method first over the horizontal boundaries from top to bottom, and then over the vertical boundaries from left to right. This since decoding is commonly performed in raster scan, and quantization over the horizontal block boundaries is more severe in the general case, hence it is desired to treat it first. However, in the most general case, the operation of the method of the present invention can be performed in any sequence involving the horizontal and vertical block boundaries.

In a preferred method embodiment, the removal of a blocking artifact includes four conceptual stages as shown in a block diagram in FIG. 3, and as described below. The four stages are:

Block Boundary Classification stage 150 is a stage performed for every pixel-duo that defines a block boundary (horizontal and vertical). This stage determines for every pixel-duo in the picture whether it resides across a Blocky boundary or a Non-Blocky boundary, thus providing the decision rule for this classification. Every pixel-duo residing across a boundary classified as Blocky goes on to be treated using the next three stages. Every pixel-duo residing across a Non-blocky boundary is passed over by the next three stages, i.e. these stages are not operative in this case.

Filtered Pixels Region Of Interest and Filter Definition stage 152. In this stage the region of interest (ROI) that contains the pixels that will undergo filtering (in a filtering stage 156, see below) is defined. In addition this stage also provides the method and rule for choosing and defining the actual filter that will perform the filtering in stage 156. All the pixel values that belong to the filtered pixels ROI will change after filtering stage 156 is performed. The filtered pixels ROI is a concatenated set of pixels that cross a block boundary in one dimension. The definition or choice of the pixels that will become members of the filtered pixels ROI is unique, and it is done according to a certain rule, explained below. The definition is such that the ROI will contain a blocky boundary and a smooth set of pixels on each side of the block boundary, and will not include edges. Once the filtered pixels ROI is defined, a unique rule provides a method for choosing a filter to be used in filtering stage 156. ROI definition stage 152 is performed for every pixel-duo residing across a boundary classified as blocky in stage 150.

Filtering Pixels Expansion stage 154. It is a well know fact that when a finite length one-dimensional ROI of values, and a finite length one-dimensional filter of, say, length L (where L is an odd number, and the $((L-1)/2+1)$ '1' filter tap is the middle filter tap) are given, and filtering is to be performed, the filtering of the $(L-1)/2$ leftmost (or top-most for the vertical case) values and the filtering of the $(L-1)/2$ rightmost (or bottom-most for the vertical case) values must be well defined. It is common to define "padding" of $(L-1)/2$ values to the left (or top) and right (or bottom) of the ROI of values. This stage in the present invention provides the technique for explicitly defining the values to be used for padding the left side (or top) and right (or bottom) side of the finite one-dimensional ROI of values that was defined in stage 152. The suggested technique for explicitly defining the values to be used for padding is defined in such a way that the outcome of the filtering stage 156 provides the best visual quality for a human observer.

Filtering stage 156 is the stage in which the actual filtering of the pixels in the filtered pixels ROI (stage 152) is performed. In the filtering stage, a one-dimensional Finite Impulse Response (FIR) Low Pass Filter (LPF) is introduced to the filtered pixels ROI. Filtering pixels expansion stage 154 is used to define the padding of the finite one-dimensional filtered pixels ROI so that the outcome of the filtering will be of high visual quality. The filter used for filtering is the filter previously defined in stage 152.

Figure 4:
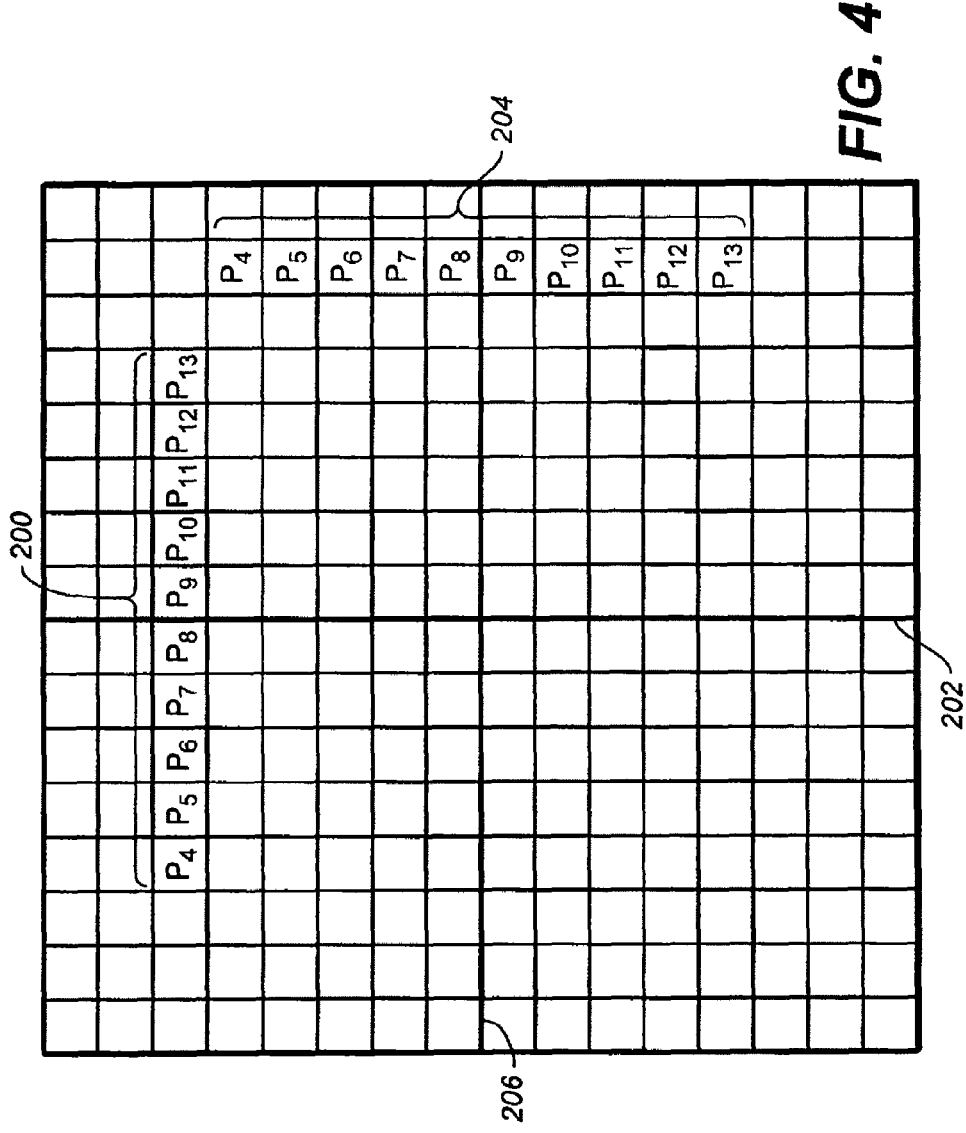
FIG. 4 shows visualization of definitions: labeling of pixels of interest of the presented method over horizontal block boundaries and vertical block boundaries.

FIG. 4 shows a 16×16 pixel image section. A set of pixels labeled P4, P5, P6, P7, P8, P9, P10, P11, $P_{12}$ and P13 form a one-dimensional pixel span (of interest regarding the present invention) that cross a block boundary. In FIG. 4, a horizontal pixel span 200 crosses a vertical block boundary 202, while a vertical pixel span 204 crosses a horizontal block boundary 206. The same numbering is used for the span of pixels over a horizontal block boundary and over a vertical block boundary.

Figure 3:
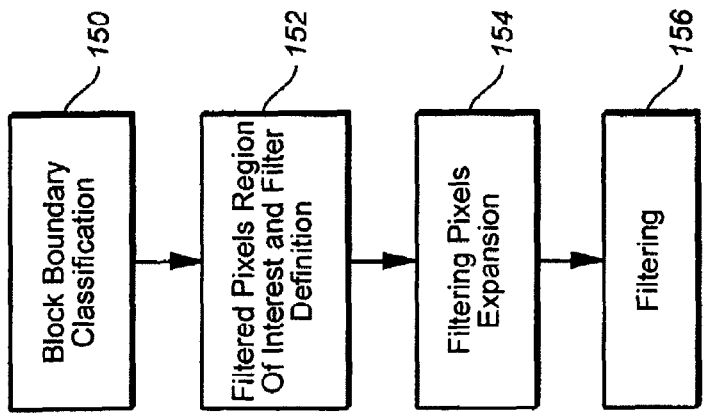
FIG. 3 shows a block diagram of the main conceptual stages of the suggested method for removing blocking artifacts.
Figure 5:
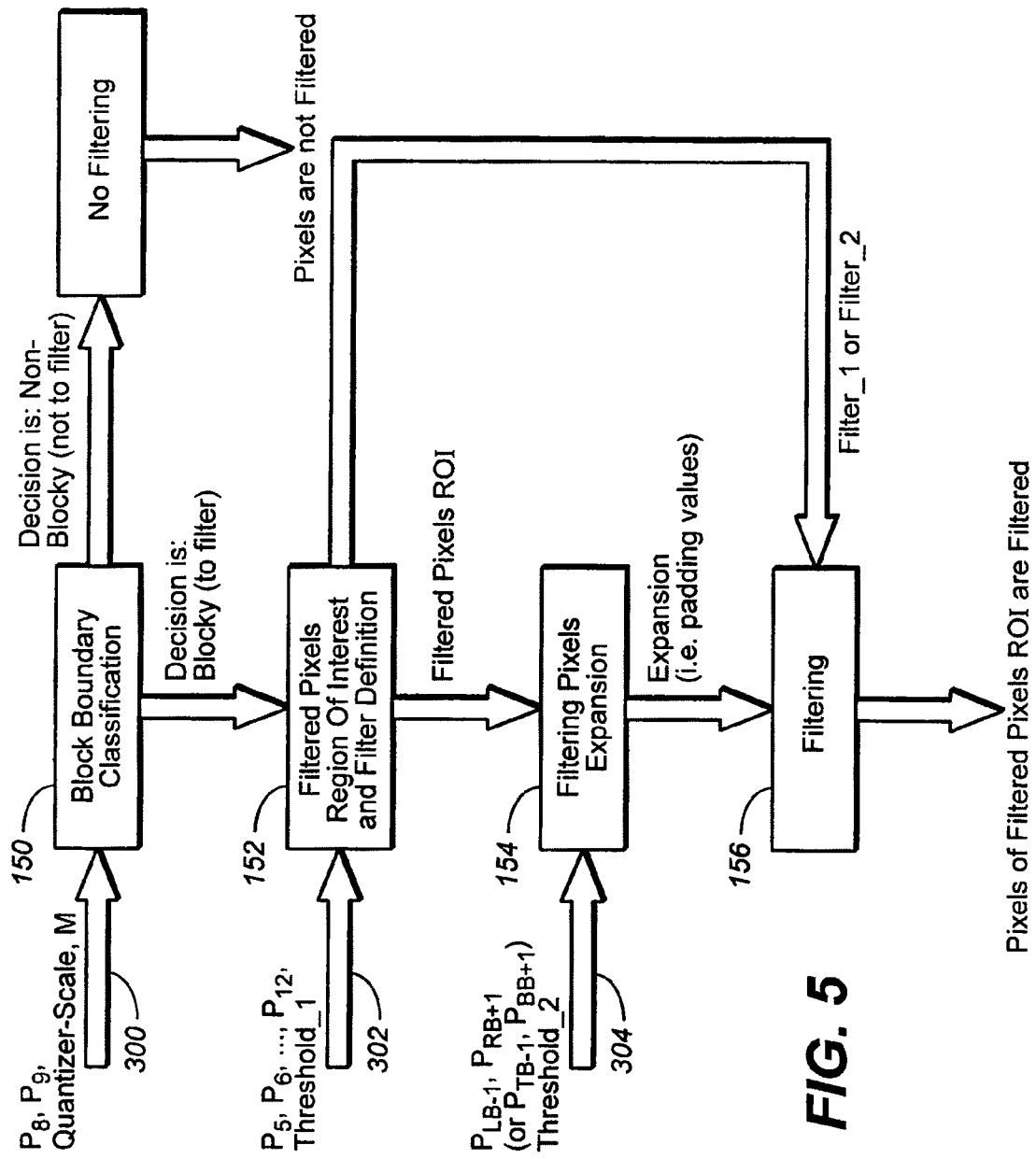
FIG. 5 shows a detailed flowchart of the conceptual stages of the suggested method for removing blocking artifacts.

FIG. 5 shows a detailed block diagram detailing the flow of the algorithm for removing blocking artifacts, which is built around the four stages 150, 152, 154, 156, of FIG. 3.

The algorithm starts with classification stage 150 using as an input 300 the pair (boundary pixel-duo) P8 and P9, and two additional parameters—the QS associated with the block containing P9, and a parameter "M". "M" is a gain, with values typically of the order of 2 to 5, which multiplies the QS parameter. The classification criteria used in the preferred embodiment is according to: $|P_8-P9| < M*(QS)$. If the condition above is true, then the block boundary associated with the specific pixel-duo Ps and P9 is classified as Blocky, and if the condition above is false then the block boundary associated with the specific pixel-duo Pg and P9 is classified as Non-Blocky.

Multiplier "M" is defined in the classification condition since the QS alone is not sufficient for a definition whether a block boundary is blocky or non-blocky. The QS alone is a direct measure for the quantization error of the mean block value, and as such it may be used only as part of the measure of blockyness. The QS is not taking into consideration higher order data like DCT basis components and their phase. By using a multiplier of a constant value, a better classification may be achieved. As a rule, all the pixels that belong to the 8×8 block boundaries (vertical and horizontal) of a reconstructed picture undergo block boundary classification stage 150.

If a specific one-dimensional block boundary is classified as Non-Blocky, no filtering is performed across it (the observation in this case is that an edge is the cause for the discontinuity between the two adjacent pixels comprising the specific pixel-duo). If a block boundary is classified as Blocky, the algorithm proceeds to stage 152 (the observation in this case is that the discontinuity between two adjacent pixels comprising the specific pixel-duo is caused by a blocking artifact).

Referring to FIG. 4, filtered pixels ROI definition stage 152 considers the span of pixels $P_5$, P6, $P_7$ and P8 on the left of a vertical block boundary (202) or above a horizontal block boundary (206), and the span of pixels P9, $P_{10}$, $P_{11}$ and P12 on the right of a vertical block boundary (202) or below a horizontal block boundary (206). P5, P6, P7, P8, P9, P10, P11 and P12 are input at an input 302 in FIG. 5.

A detailed iterative procedure for the definition of the filtered pixels ROI is now given below.

The basic operation is measuring the absolute gray-level difference of two adjacent (neighboring) pixels against a predetermined threshold (Threshold 1), input at a first threshold input 302. If the absolute gray-level difference of two adjacent pixels is smaller than or equal to Threshold.1, then those two adjacent pixels are considered similar (it is an observation of this invention that such two pixels form a concatenation of two pixels both belonging to a smooth area). If the absolute gray-level difference of two adjacent pixels is larger than Threshold.1, then those two adjacent pixels are considered not similar, hence implying the presence of an edge in the picture content. A typical range for Threshold_I is between 2-6, with most preferable values being 3 and 4.

The first iteration starts with the check IP8-P71<_Threshold 1. If true, P7 is in the filtered pixels ROI, bounding (closing) it from the left in the case of a vertical boundary (e.g. boundary 202 in FIG. 4) and from the top in the case of a horizontal boundary (e.g. boundary 206 in FIG. 4). Else (i.e. if IP8-P71>Threshold.1 the filtered pixels ROI is bound (closed) on the left for boundary 202, and from the top for boundary 206 by P8. Within this text we will refer to any of the pixels P8 down to P5 that close the filtered pixels ROI from the left as a "left bounding ROI pixel" or "PLB". The discussion will continue with reference to "left to right" pixel ranges crossing a vertical boundary, with the understanding that the definition of a vertical filtered pixels ROI crossing a horizontal boundary is identical. Specifically, in FIG. 4, any of pixels P8 down to P5 in span 204 that close the filtered pixels ROI crossing boundary 206 from the top will be a "top bounding ROI pixel" or "PTB".

If the filtered pixels ROI was not closed by P8 (that is if P7 was the left bounding ROI pixel of the first iteration), a next iteration is run in which the check is 1P7-P61<_Threshold.1. If true, P6 is in the filtered pixels ROI and is the PLB. Else, P6 is not in the filtered pixels ROI, and hence $P_7$ is the $P_L B$, and the process of defining the left boundary of the filtered pixels ROI stops.

If the filtered pixels ROI was not closed by $P_7$, then the next iteration checks if JP6-P51<Threshold 1. If true, P5 is in the filtered pixels ROI, the process of defining the ROI from the left ends, and the filtered pixels ROI is closed from the left side by P5 (P5 is the $P_L B$). Else, $P_5$ is not in the filtered pixels ROI and $P_6$ is the PLB.

Next, a similar iterative procedure is run on the four pixels P9-P12 across the boundary. As above, and without any loss of generality, we will deal with a horizontal span crossing a vertical boundary, the aim of this part of the procedure being to find a "right bounding ROI pixel" or "PRB", equivalent to a "bottom bounding ROI pixel" or "PBB" of a vertical span crossing a horizontal boundary. Starting in a first iteration with the check JP9-P101<Threshold.1. If true, then $P_{10}$ is in the filtered pixels ROI (and is the PRB) and the process of defining the ROI continues. Else, Plo is not in the filtered pixels ROI, the filtered pixels ROI is closed from the right side by P9, which is the Paa, and the process of defining the ROI stops. Following a respective "continuation" decision, similar iterations are run with the checks JP1oP,1J<_Threshold-1 and IP11-P121<_Threshold.1.

It is important to note that there is no relation between the magnitude of the QS used in classification stage 150 and Threshold.I used in stage 152. In stage 152, the internal block gray-level self-similarity of the pixels is of main interest. For example, there might be an area of smooth content (or even constant content) in which self-similarity of values inside the block exists, co-existing with a large discontinuity over a block boundary that was caused by a large value of quantization in the encoding process.

It is stated as part of this invention that the iterative procedure defined above can be generalized to work with any block size, and it is not limited to 8×8 pixel blocks. A generalization is done by iterating for N/2 steps the basic rule IPx-Px-1!<_Threshold 1, N being the size of the block, and "X" starting from the index associated with the pixels most adjacent to a block boundary. X stars from the left side for a vertical boundary, and from the top side for a horizontal boundary, in the left and top direction, A generalization is similarly done by iterating for N/2 steps the basic rule IPx−Px+1I<_Threshold 1, N being the size of the block, and "X" starting from the index associated with the pixels most adjacent to a block boundary from the right side for a vertical boundary and from the bottom side for a horizontal boundary, in the right and bottom direction. The description below continues with reference to the special case of 8×8 pixel blocks, with the understanding that the invention as described works with general N×N blocks as well.

Once the filtered pixels ROI is decided, the algorithm, in stage 152, proceeds to define the filter that will be used in the filtering stage (156). In the preferred embodiment, the filter is chosen according to the size of the filtered pixels ROI, as explained below. The filtered pixels ROI may include in the case of 8×8 blocks: 2, 3, 4, 5, 6, 7 or 8 pixels, in one of 16 different pixels compositions (for example: P7, P8, P9 and P8, P9, Plo form two compositions of 3 pixels, P6, P7, P8, P9 and P7, P8, P9, P10 and P8, P9, Plo, P11 form three compositions of 4 pixels, and so on). The FIR filter is preferably chosen according to the following rule: if the length of the filtered pixels ROI is exactly 8 pixels, then the filter to be used in filtering stage 156 is a 9 Taps FIR filter labeled Filter 1, where Filter.1 [h0, h1, h2, h3, h4, h5, h6, $h_7$, $h_8$], (h4 being the center of the filter). Typical values for Filter.1 are Filter.1=[1 1 2 2 4 2 2 1 1]/16, however any low pass filter having the same nature will also be suitable. If the length of the filtered pixels ROI is less than 8 pixels, then the filter to be used in filtering stage 156 is a 5 Taps FIR filter labeled Filter 2, where Filter.2=[ho, h1, h2, h3, h4], (h2 being the center of the filter). Typical values for Filter.2 are Filter.2=[1 1 4 1 1]/8, however any low pass filter having the same nature will also be suitable.

It is an observation of this invention that if the filtered pixels ROI is 8 pixels long, then the 8 pixels of the filtered pixels ROI belong to a smooth area in the picture. In this case a long filter will provide better smoothing of the blocking artifact, hence a filter 9 Taps long is chosen in the preferred embodiment.

Once the filtered pixels ROI and the filter to be used in the filtering stage are decided, the algorithm proceeds to stage 154—the filtering pixels expansion stage. In this stage, the values to be used for padding the left (or top) side and right (or bottom) side of the finite horizontal (or vertical) one-dimensional ROI of values are determined.

The expansion value (i.e. the value to be used for padding in filtering stage 156) is preferably determined by measuring and comparing the absolute gray-level difference of two adjacent (neighboring) pixels, of which one is a filtered pixels ROI "bounding pixel" and the other an adjacent neighbor, against a pre-determined threshold (Threshold 2). Threshold 2 is input at a second threshold input 304, and is typically larger by an order of magnitude than Threshold 1. In the horizontal direction (for vertical block boundaries 202) stage 152 defined the left bounding ROI pixel (PLB) and the right bounding ROI pixel (PRB). The expansion to the left of $P_{LB}$ is determined according to: IP$_{LB}$−PLB.11<Threshold 2, where PLB−1 is the pixel to the left of PLB. If true, PLB−1 is the expansion pixel and the value of $_{PLB-1}$ is used for padding in filtering stage 156. Else, PLB is the expansion pixel and the value of PLB is the value used for padding in filtering stage 156. The expansion to the right of PRB is determined according to: {P$_{RB}$−PRB+1I<Threshold 2, where PRB+1 is the pixel to the right of PRB. If true, PRB+1 is the expansion pixel and the value of PRB+1 is used for padding in filtering stage 156.

Else, PRB is the expansion pixel and the value of $P_R$B is the value used for padding in filtering stage 156.

In the vertical direction (for horizontal block boundaries 206), the expansion value is determined in a similar fashion, but replacing PLB and PRB with, respectively, P$_{TB}$ and PBR. The padding to the top of $_{PTB}$ is determined according to: IPTg−PTB−1I<Threshold 2, where PTB.1 is the pixel immediately above PTB. If true, $_{PTB-1}$ is the expansion pixel and the value of PTB−1 is used for padding in filtering stage 156. Else, PTB is the expansion pixel and the value of PTB is the value used for padding in filtering stage 156. The padding to the bottom of PBB is determined according to: IPBB−PBB+1I<_Threshold.2, where PBB+1 is the pixel immediately below PBB. If true, PBB+1 is the expansion pixel and the value of PBB+1 is used for padding in filtering stage 156. Else, PBB is the expansion pixel and the value of PBB is the value used for padding in filtering stage 156. For example if P5 was found to be a PLB in stage 152, expansion stage 154 will check the value of $P_5$ against the value of P4 (in this case=PLB.I), specifically IP5−P41<Threshold.2. If true, P4 is the expansion (i.e. the padding value) that will be used for padding the finite filtered pixels ROI from the left side in filtering stage 156. Else, P5 is the expansion (i.e. the padding value) that will be used for padding the finite filtered pixels ROI from the left side in filtering stage 156.

Figure 6:
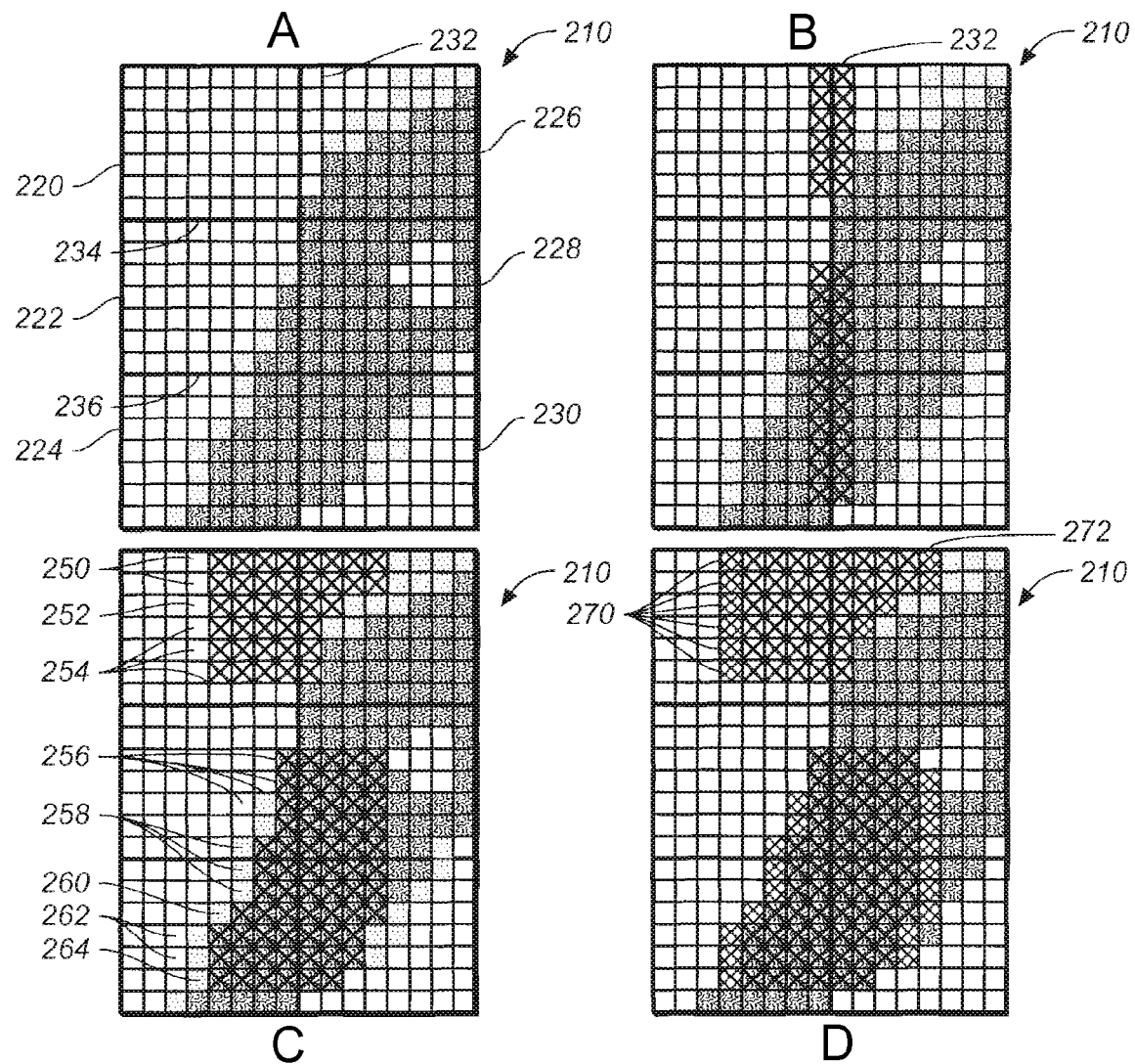
FIG. 6 shows an example of the conceptual stages of the suggested method for removing blocking artifacts: A—part of a picture, B—illustration of classification stage, C—illustration of filtered pixels ROI stage, and D—illustration of filtered pixels expansion stage.

Referring now to FIG. 6, the three stages 150, 152, 154 are illustrated clearly via an example. FIG. 6A illustrates six blocks 220, 222, 224, 226, 228 and 230 of a picture 210, divided by a vertical boundary 232 and two horizontal boundaries 234 and 236. FIG. 6B illustrates classification stage 150 performed on picture 210. In B, pixels marked "X" illustrate several boundary pixel-duos (and according to FIG. 4 referred to as pixels P$_8$ and P9) that were classified as Blocky across vertical block boundary 232 (i.e. P8 and P9 are classified as residing on each side of a blocky boundary). FIG. 6C illustrates the result of the filtered pixels ROI stage 152. For all the vertical boundaries classified as Blocky in FIG. 6B, a different filtered pixels ROI is determined according to the picture content. In FIG. 6C, eight different cases of filtered pixels ROI are presented: 250 (two symmetric sets of 8 pixels), 252 (one asymmetric set of 4 pixels to the left, i.e. P8, P7, P6, P5, and two to the right, i.e. P9, P10, of boundary 232, 254 (three asymmetric sets of 5 pixels, 4 to the left and 1 to the right of boundary 232), 256, 258, 260, 262 and 264. In 250, P5 is the left bounding ROI pixel and P12 is the right bounding ROI pixel, in 252, P5 is the left bounding ROI pixel and P10 is the right bounding ROI pixel, in 254, P5 is the left bounding ROI pixel and P9 is the right bounding ROI pixel. The latter five ROIs are not explained in detail, but clearly follow the explanations of the first three. All pixels marked "X" in FIG. 6C will be changed by filtering stage 156. Finally, FIG. 6D illustrates the outcome of the filtering pixels expansion stage (154) (in the figure only the expansion pixels that are not ROI bounding pixels are uniquely marked, for example pixels 270 and 272, for simpler visualization. Where not uniquely marked, the bounding pixel itself is used for padding).

The filtered pixels ROI process of stage 152 allows only similar gray-leveled pixels to join the filtered pixels ROI, hence an edge in the picture content will stop the growth of the filtered pixels ROI (which is the desired behavior in stage 152). In filtering stage 156, to which the algorithm proceeds next, a filtering process smoothes the filtered pixels ROI using a finite length low pass filter. If the edge that stopped the growth of the filtered pixels ROI is high, then the visual result after filtering is good. If the edge that stopped the growth of the filtered pixels ROI is mild ("mild" herein is considered to be more or less 25 to 45 gray-levels difference), the filtering pixels expansion stage is designed to allow mild edges to be used for padding (e.g. if Threshold.2 is chosen to be of the order of the mild edges gray-levels difference, i.e. between typically 25 and 45, and most preferably between 25 and 30). This way, mild edges are slightly smoothed by the algorithm, producing good visual quality.

The filtering procedure includes two steps: padding the finite length one-dimensional filtered pixels ROI using the expansion values, and filtering the finite length filtered pixels ROI with the filter.

Figure 7:
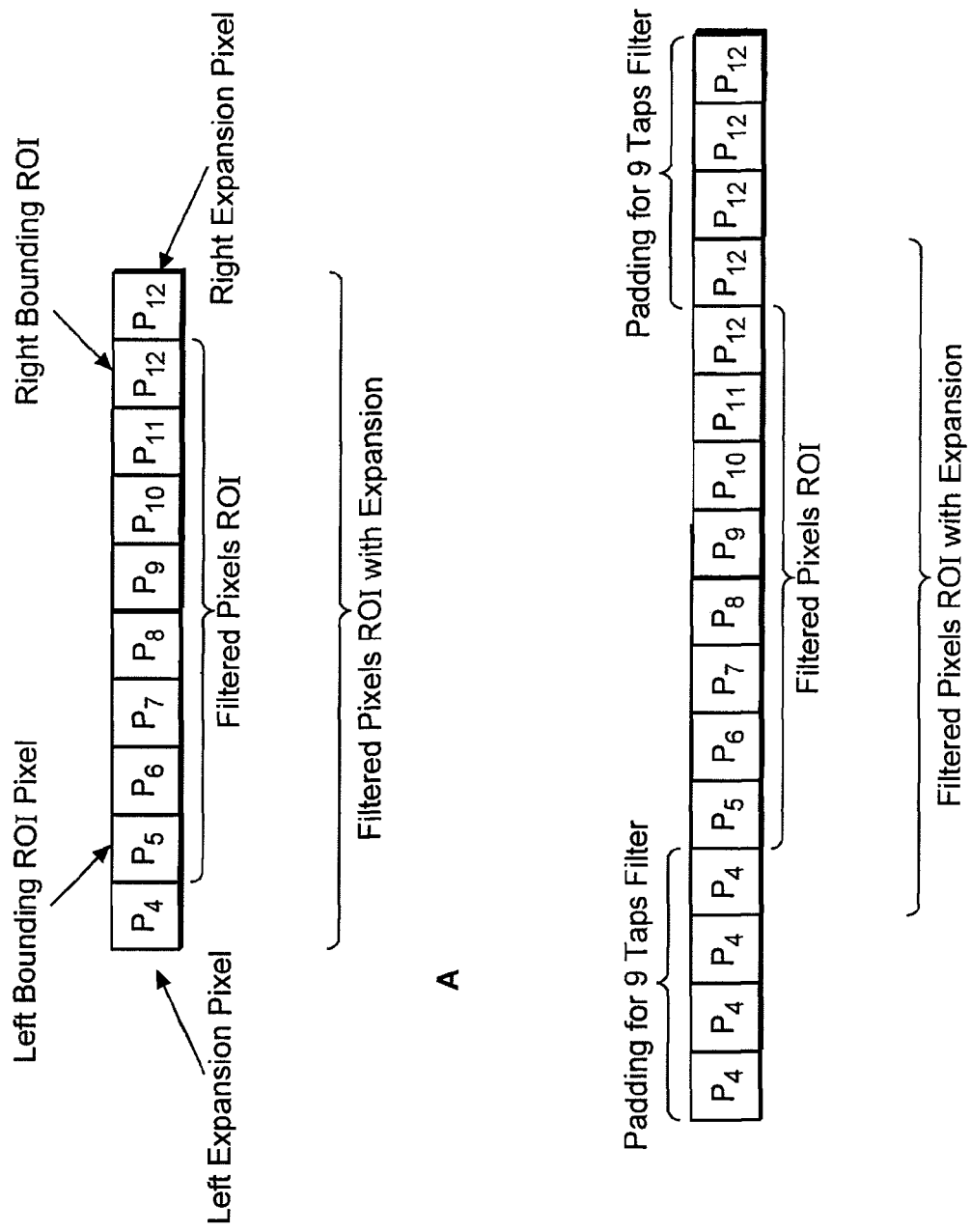
FIG. 7 shows examples for padding for a 9 taps filter: A—filtered pixels ROI with and without expansion, and B—filtered pixels ROI with expansion and padding.
Figure 8:
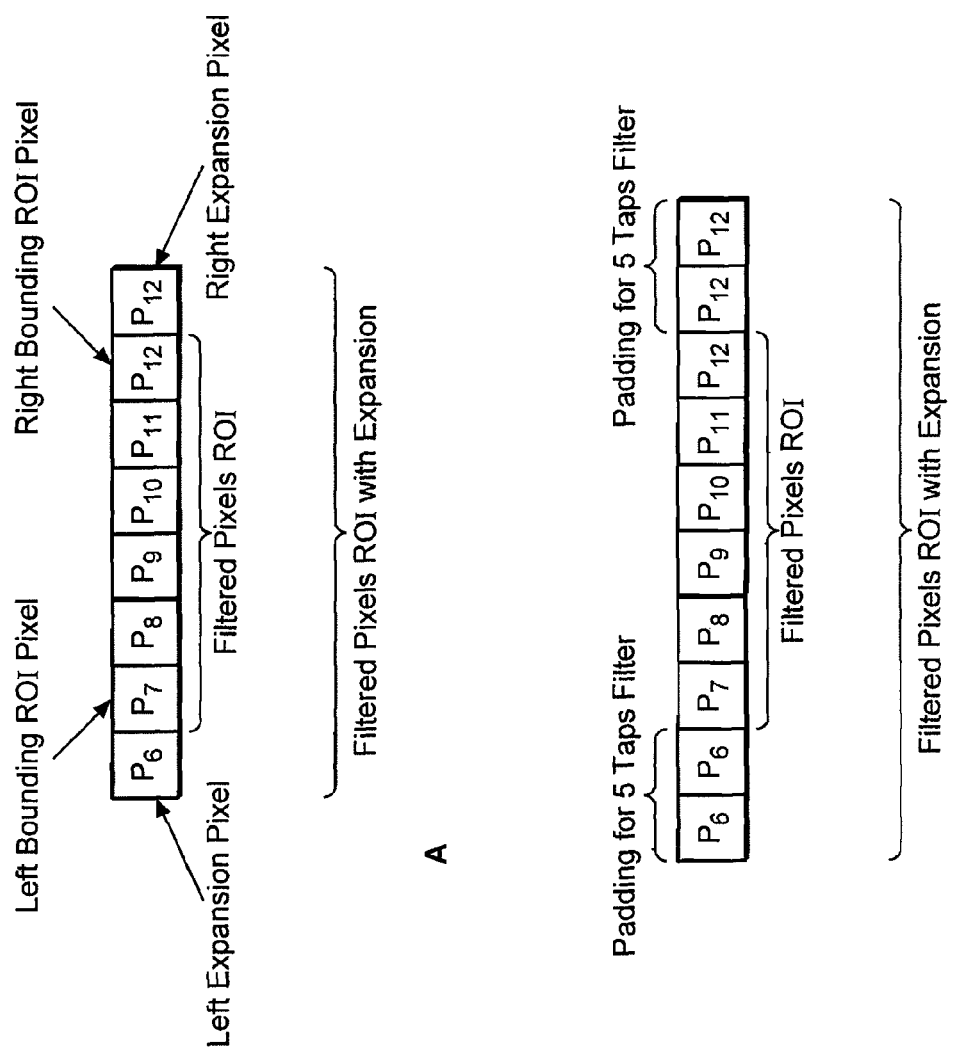
FIG. 8 shows examples for padding for a 5 taps filter: A—filtered pixels ROI with and without expansion, and B—filter pixels ROI with expansion and padding.

The padding step has two possible scenarios, depending on the length of the filter (which is an outcome of stage 152). FIG. 7 and FIG. 8 depict the two scenarios for a vertical boundary case: FIG. 7 depicts the scenario in which the 9 taps filter is used, and FIG. 8 depicts the scenario in which the 5 taps filter is used.

In FIG. 7A, the filtered pixels ROI is P5 to P12, hence the 9 Taps filter (Filter 1) is used. The left side of the filtered pixels ROI was expanded by pixel P4 (identically PLB−1), so the padding in FIG. 7B is done by adding four pixels of value P4 to the left of the filtered pixels ROI (filtering will start at P5 since P5 is the first pixel in the filtered pixels ROI. $P_4$ contributes to the filtering but it is not altered by it). The right side of the ROI was expanded by pixel P12 (identically PRB), in which case the padding in FIG. 7B is done by adding four pixels of value $P_{12}$ to the right of the filtered pixels ROI.

In FIG. 8A, the filtered pixels ROI is P7 to P12, hence the 5 Taps filter (Filter 2) is used. The left side of the filtered pixels ROI was expanded by pixel P6 (identically $P_{LB}$−1), so the padding in FIG. 7B is done by adding two pixels of value P6 to the left of the filtered pixels ROI (filtering will start at P7 since $_{P7}$ is the first pixel in the filtered pixels ROI. P6 contributes to the filtering but it is not altered by it). The right side of the filtered pixels ROI was expanded by pixel P12 (identically PRB), in which case the padding in FIG. 8B is done by adding two pixels of value P12 to the right of the filtered pixels ROI.

The filtering process is simply a finite length one-dimensional filtering between the finite length filter and the finite length padded filtered pixels ROI, and the result is taken only for the pixels that are the members of the filtered pixels ROI.

Figure 9A:
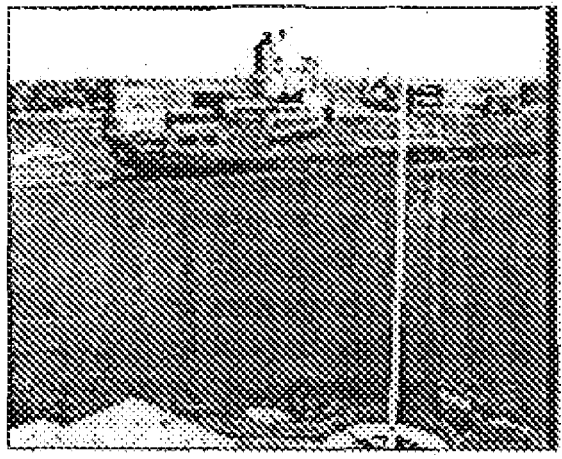
FIGS. 9A, 9B, 9C and 9D show examples of the performance of the suggested de-blocking method.
Figure 9B:
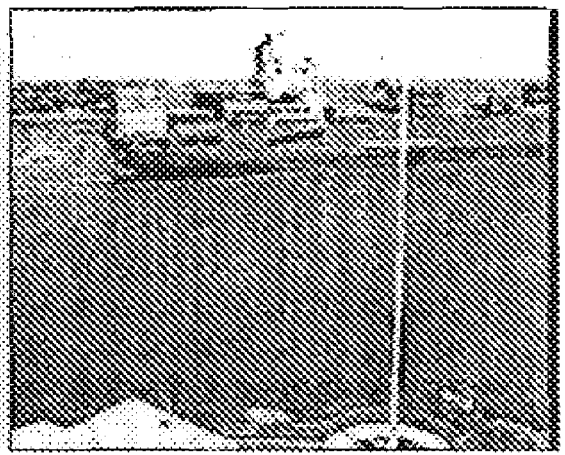
Figure 9C:
Figure 9D:

Finally, referring to FIG. 9 that shows an example of the performance of the suggested method for removing blocking artifacts, FIG. 9A and FIG. 9C present pictures encoded at a bit rate of 40 Kbps and a frame rate of 10 fps, in which the blocking artifact is visible, FIG. 9B and FIG. 9D present respectively the outcome of the suggested de-blocking method for the two compressed pictures.

In summary, a major innovative aspect of the method of the present invention includes the adaptive choice of filtered pixels ROI—we choose the entire population of pixels that can be smoothed without causing artifacts (like smoothing out an edge). The method works well with any number of edges in the processed picture content. Another innovative aspect is the way bounding conditions for finite length filtering are treated, as a result of the method's ability to distinguish between high and mild edges. In addition, more aggressive filtering is introduced for areas defined as smooth. As a result the quality and sharpness of the picture are not reduced by applying this method to blocky pictures.

Other advantages of the present method include:

a) making a distinct separation between strong edges and mild edges, b) never missing a block boundary (edge in the block or not), c) not smoothing out an edge into the data, and d) exploiting the full width of the smooth region.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A system that employs a plurality of stages to remove blocking artifacts from moving and still pictures, each picture composed of blocks defined by horizontal and vertical block boundaries, comprising:

a block boundary classification stage that classifies, in each picture, horizontal and vertical boundaries as having a difference in pixel values across the boundaries as being more or not more than a predetermined level;

a filtered pixels region of interest (ROI) stage that is operative for each said classified boundary having a difference in pixel values across the boundaries as being not more than said predetermined level defining a one-dimensional filtered pixels ROI with an adaptive, picture content-dependent spatial extent, having two ends and bounded at each said end by a bounding pixel, said ROI including a first plurality of concatenated, adjacent pixels to be filtered, said ROI crossing said boundary having a difference in pixel values across the boundaries as being not more than said predetermined level, and wherein defining the adaptive, picture content-dependent spatial extent of the ROI comprises iteratively checking pixels on each side of the block boundary to determine whether the pixel is to be included in the ROI until each end of the ROI is closed by its bounding pixel;

a filter definition stage that defines a finite filter with a length correlated with said first plurality of concatenated, adjacent pixels of said ROI;

a filtering pixels expansion stage that defines a filtering pixels expansion having a second one dimensional plurality of pixels, said second plurality including said first plurality of pixels; and a filtering stage that is operative to filter said first plurality of pixels using said finite filter and said filtering pixels expansion stage.

2. The system of claim 1, wherein said ROI is symmetric.

3. The system of claim 1, wherein said ROI is asymmetric.

4. The system of claim 1, wherein said classifying includes classifying boundaries spaced apart from each other by 8 pixels.

5. The system of claim 4, wherein said classifying further includes:

assigning the value of each pixel of a boundary pixel-duo $P_8$ and $P_9$, said boundary pixel-duo included in said first pixel plurality and straddling said block boundary;

choosing a multiplier M and receiving a quantization scale parameter QS; and classifying said block boundary as having a difference in pixel values across the boundaries as being not more than said predetermined level if $|P_8-P_9|\leq(M*QS)$.

6. The system of claim 4, wherein said definition of an adaptive one-dimensional filtered pixels ROI includes:

for each said boundary having a difference in pixel values across the boundaries as being not more than said predetermined level, assigning four pixel values $P_5$, $P_6$, $P_7$, $P_8$ of adjacent pixels residing on a left side for a vertical block boundary and on a top side for a horizontal block boundary, and four pixel values $P_9$, $P_{10}$, $P_{11}$, $P_{12}$ of adjacent pixels residing on a right side for a vertical block boundary and on a bottom side for a horizontal block boundary;

providing a threshold, Threshold_1, and, iteratively; and comparing absolute value differences between each said adjacent pixel pair on each side of said boundary having a difference in pixel values across the boundaries as being not more than said predetermined level and said Threshold_1.

7. A processor readable storage media that includes executable instructions for enabling actions to remove blocking artifacts from moving and still pictures, each picture composed of blocks defined by horizontal and vertical block boundaries, the actions comprising:

in each picture, classifying horizontal and vertical boundaries as having a difference in pixel values across the boundaries as being more or not more than a predetermined level;

for each said classified boundary having a difference in pixel values across the boundaries as being not more than said predetermined level defining a one-dimensional filtered pixels region of interest (ROI) with an adaptive, picture content-dependent spatial extent, having two ends and bounded at each said end by a bounding pixel, said ROI including a first plurality of concatenated, adjacent pixels to be filtered, said ROI crossing said boundary having a difference in pixel values across the boundaries as being not more than said predetermined level, and wherein defining the adaptive, picture content-dependent spatial extent of the ROI comprises iteratively checking pixels on each side of the block boundary to determine whether the pixel is to be included in the ROI until each end of the ROI is closed by its bounding pixel;

defining a finite filter with a length correlated with said first plurality of concatenated, adjacent pixels of said ROI;

defining a filtering pixels expansion having a second one dimensional plurality of pixels, said second plurality including said first plurality of pixels; and filtering said first plurality of pixels using said finite filter and said filtering pixels expansion.

8. The processor readable storage media of claim 7, wherein said ROI is at least one of symmetric or asymmetric.

9. The processor readable storage media of claim 7, wherein said classifying further includes:

assigning the value of each pixel of a boundary pixel-duo $P_8$ and $P_9$, said boundary pixel-duo included in said first pixel plurality and straddling said block boundary;

choosing a multiplier M and receiving a quantization scale parameter QS; and classifying said block boundary as having a difference in pixel values across the boundaries as being not more than said predetermined level if $|P_8-P_9| \leq (M*QS)$.

10. The processor readable storage media of claim 7, wherein said definition of an adaptive one-dimensional filtered pixels ROI includes:

for each said boundary having a difference in pixel values across the boundaries as being not more than said predetermined level, assigning four pixel values $P_5$, $P_6$, $P_7$, $P_8$ of adjacent pixels residing on a left side for a vertical block boundary and on a top side for a horizontal block boundary, and four pixel values $P_9$, $P_{10}$, $P_{11}$, $P_{12}$ of adjacent pixels residing on a right side for a vertical block boundary and on a bottom side for a horizontal block boundary;

providing a threshold, Threshold_1, and, iteratively; and comparing absolute value differences between each said adjacent pixel pair on each side of said boundary having a difference in pixel values across the boundaries as being not more than said predetermined level and said Threshold_1.

11. A system that employs a plurality of stages to remove blocking artifacts from moving and still pictures, each picture composed of blocks defined by horizontal and vertical block boundaries, comprising:

a block boundary classification stage that classifies in each picture horizontal and vertical boundaries as blocky or non-blocky, wherein said classifying includes classifying boundaries spaced apart from each other by 8 pixels;

a filtered pixels region of interest (ROI) stage that for each said classified blocky boundary, defining an adaptive, picture content-dependent, one-dimensional filtered pixels ROI having two ends and bounded at each said end by a bounding pixel, said ROI including a first plurality of concatenated, adjacent pixels to be filtered, said ROI crossing said blocky boundary;

a filter definition stage that defines a finite filter with a length correlated with said first plurality of concatenated, adjacent pixels of said ROI;

a filtering pixels expansion stage that defines a filtering pixels expansion having a second one dimensional plurality of pixels, said second plurality including said first plurality of pixels; and a filtering stage that filters said first plurality of pixels using said finite filter and said filtering pixels expansion, wherein said definition of an adaptive one-dimensional filtered pixels ROI includes:

for each said blocky boundary, assigning four pixel values $P_5$, $P_6$, $P_7$, $P_8$ of adjacent pixels residing on a left side for a vertical block boundary and on a top side for a horizontal block boundary, and four pixel values $P_9$, $P_{10}$, $P_{11}$, $P_{12}$ of adjacent pixels residing on a right side for a vertical block boundary and on a bottom side for a horizontal block boundary;

providing a threshold, Threshold_1, and, iteratively; and comparing absolute value differences between each said adjacent pixel pair on each side of said blocky boundary and said Threshold_1, wherein said comparison of absolute value differences includes, iteratively:

checking if $|P_X-P_{X-1}| \leq$ Threshold_1 wherein X is successively 8, 7 and 6 and, if true, including each said $P_{X-1}$, in said filtered pixels ROI, said ROI bound with said $P_5$ as said bounding pixel on said left side for a vertical block boundary and on said top side for a horizontal block boundary; else using said $P_X$ as said bounding pixel to bound said ROI on said left side for a vertical block boundary and on said top side for a horizontal block boundary; and checking if $|P_X-P_{X+1}| \leq$ Threshold_1 wherein X is successively 9, 10 and 11 and, if true, including each said $P_{X-1}$ in said filtered pixels ROI, said ROI bound with said $P_{12}$ as said bounding pixel on said right side for a vertical block boundary and on said bottom side for a horizontal block boundary; else using said $P_X$ as said bounding pixel to bound said ROI on said right side for a vertical block boundary and on said bottom side for a horizontal block boundary.

12. The system of claim 11, wherein said definition of the finite filter further includes:
   if said filtered pixels ROI includes 8 pixels $P_5$ to $P_{12}$, defining said filter as Filter_1 where Filter_1=[$h_0, h_1, h_2, h_3, h_4, h_5, h_6, h_7, h_8$]; and
   if said filtered pixels ROI includes less then 8 pixels, defining said filter as Filter_2 where Filter_2=[$h_0, h_1, h_2, h_3, h_4$].

13. The system of claim 12, wherein said filtering of said filtered pixels ROI using said Filter_1 and said filtering pixels expansion includes:
   padding four values to each side of said one-dimensional filtered pixels ROI using the filtering pixels expansion values; and
   filtering said one-dimensional filtered pixels ROI using said Filter_1.

14. The system of claim 12, wherein said filtering of said filtered pixels ROI using said Filter_2 and said filtering pixels expansion includes:
   padding two values to each side of said one-dimensional filtered pixels ROI using said filtering pixels expansion values; and
   filtering said one-dimensional filtered pixels ROI using said Filter_2.

15. The system of claim 11, wherein said defining the filtering pixel expansion includes:
   receiving as input said bounding pixel of said filtered pixels ROI, said bounding pixel value obtained in said checking;
   receiving as input a pixel adjacent to said bounding pixel, said adjacent pixel residing outside said filtered pixels ROI;
   providing a threshold Threshold_2; and
   calculating an absolute gray-level difference between said bounding pixel and said adjacent pixel, and comparing said absolute gray-level difference with said Threshold_2.

16. The system of claim 15, wherein said comparing said absolute gray-level
   difference with said Threshold_2 further includes, for the vertical block boundary:
      checking if $|P_{LB}-P_{LB-}|\leq$Threshold_2 where $P_{LB-1}$ is the pixel immediately adjacently to the left of $P_{LB}$ and $P_{LB}$ is said left bounding pixel, and if true using the value of said $P_{LB-1}$ for said expansion; else
   using the value of said PLB for said expansion; and
      checking if $|P_{RB}-P_{RB+1}|\leq$Threshold_2, where $P_{RB+1}$ is the pixel immediately adjacently to the right of $P_{RB}$ and $P_{RB}$ is said right bounding pixel, and if true, using the value of said $P_{RB+1}$ for said expansion; else
   using the value of said $P_{RB}$ for said expansion.

17. The system of claim 15, wherein said comparing said absolute gray-level difference with said Threshold_2 further includes, for the horizontal block boundary:
   checking if $|P_{TB}-P_{TB-1}|\leq$Threshold_2 where $P_{TB-1}$ is the pixel immediately adjacently above $P_{TB}$ and $P_{TB}$ is said top bounding pixel, and if true, using the value of said $P_{TB-1}$ for said expansion; else
   using the value of said $P_{TB}$ for said expansion; and
   checking if $|P_{BB}-P_{BB+1}|\leq$Threshold_2, where $P_{BB+1}$ is the pixel immediately adjacently below $P_{BB}$ and $P_{BB}$ is said bottom bounding pixel, and if true, using the value of said $P_{BB+1}$ for said expansion; else
   using the value of said $P_{BB}$ for said expansion.

18. A processor readable storage media that includes executable instructions for enabling actions to remove blocking artifacts from moving and still pictures, each picture composed of blocks defined by horizontal and vertical block boundaries, the actions comprising:
   in each picture, classifying horizontal and vertical boundaries as blocky or non-blocky, wherein said classifying includes classifying boundaries spaced apart from each other by 8 pixels;
   for each said classified blocky boundary, defining an adaptive, picture content-dependent, one-dimensional filtered pixels region of interest (ROI) having two ends and bounded at each said end by a bounding pixel, said ROI including a first plurality of concatenated, adjacent pixels to be filtered, said ROI crossing said blocky boundary;
   defining a finite filter with a length correlated with said first plurality of concatenated, adjacent pixels of said ROI;
   defining a filtering pixels expansion having a second one dimensional plurality of pixels, said second plurality including said first plurality of pixels; and
   filtering said first plurality of pixels using said finite filter and said filtering pixels expansion, wherein said definition of an adaptive one-dimensional filtered pixels ROI includes:
      for each said blocky boundary, assigning four pixel values $P_5, P_6, P_7, P_8$ of adjacent pixels residing on a left side for a vertical block boundary and on a top side for a horizontal block boundary, and four pixel values $P_9, P_{10}, P_{11}, P_{12}$ of adjacent pixels residing on a right side for a vertical block boundary and on a bottom side for a horizontal block boundary;
      providing a threshold, Threshold_1, and, iteratively; and
      comparing absolute value differences between each said adjacent pixel pair on each side of said blocky boundary and said Threshold_1, wherein said comparison of absolute value differences includes, iteratively:
         checking if $|P_X-P_{X-}|\leq$Threshold_1 wherein X is successively 8, 7 and 6 and, if true, including each said $P_{X-1}$, in said filtered pixels ROI, said ROI bound with said $P_5$ as said bounding pixel on said left side for a vertical block boundary and on said top side for a horizontal block boundary; else
         using said $P_X$ as said bounding pixel to bound said ROI on said left side for a vertical block boundary and on said top side for a horizontal block boundary; and
         checking if $|P_X-P_{X+1}|\leq$Threshold_1 wherein X is successively 9, 10 and 11 and, if true, including each said $P_{X-1}$ in said filtered pixels ROI, said ROI bound with said $P_{12}$ as said bounding pixel on said right side for a vertical block boundary and on said bottom side for a horizontal block boundary; else
         using said $P_x$ as said bounding pixel to bound said ROI on said right side for a vertical block boundary and on said bottom side for a horizontal block boundary.

19. The processor readable storage media of claim 18, wherein said definition of the finite filter further includes:
   if said filtered pixels ROI includes 8 pixels $P_5$ to $P_{12}$, defining said filter as Filter_1 where Filter_1=[$h_0, h_1, h_2, h_3, h_4, h_5, h_6, h_7, h_8$]; and
   if said filtered pixels ROI includes less then 8 pixels, defining said filter as Filter_2 where Filter_2=[$h_0, h_1, h_2, h_3, h_4$].

20. The processor readable storage media of claim 19, wherein said filtering of said filtered pixels ROI using said Filter_1 and said filtering pixels expansion includes:

padding four values to each side of said one-dimensional filtered pixels ROI using the filtering pixels expansion values; and filtering said one-dimensional filtered pixels ROI using said Filter_1.

21. The processor readable storage media of claim 19, wherein said filtering of said filtered pixels ROI using said Filter_2 and said filtering pixels expansion includes:

padding two values to each side of said one-dimensional filtered pixels ROI using said filtering pixels expansion values; and filtering said one-dimensional filtered pixels ROI using said Filter_2.

22. The processor readable storage media of claim 18, wherein said defining the filtering pixel expansion includes:

receiving as input said bounding pixel of said filtered pixels ROI, said bounding pixel value obtained in said checking;

receiving as input a pixel adjacent to said bounding pixel, said adjacent pixel residing outside said filtered pixels ROI;

providing a threshold Threshold_2; and calculating an absolute gray-level difference between said bounding pixel and said adjacent pixel, and comparing said absolute gray-level difference with said Threshold_2.

23. The processor readable storage media of claim 22, wherein said comparing said absolute gray-level difference with said Threshold_2 further includes, for the vertical block boundary:

checking if $|P_{LB}-P_{LB_{-1}}| \leq$ Threshold_2 where $P_{LB-1}$ is the pixel immediately adjacently to the left of $P_{LB}$ and $P_{LB}$ is said left bounding pixel, and if true using the value of said $P_{LB-1}$ for said expansion; else using the value of said $P_{LB}$ for said expansion; and checking if $|P_{RB}-P_{RB+1}| \leq$ Threshold_2, where $P_{RB+1}$ is the pixel immediately adjacently to the right of $P_{RB}$ and $P_{RB}$ is said right bounding pixel, and if true, using the value of said $P_{RB+1}$ for said expansion; else using the value of said $P_{RB}$ for said expansion.

24. The processor readable storage media of claim 22, wherein said comparing said absolute gray-level difference with said Threshold_2 further includes, for the horizontal block boundary:

checking if $|P_{TB}-P_{TB-1}| \leq$ Threshold_2 where $P_{TB-1}$ is the pixel immediately adjacently above $P_{TB}$ and $P_{TB}$ is said top bounding pixel, and if true, using the value of said $P_{TB-1}$ for said expansion; else using the value of said $P_{TB}$ for said expansion; and checking if $|P_{BB}-P_{BB+1}| \leq$ Threshold_2 where $P_{BB+1}$ is the pixel immediately adjacently below $P_{BB}$ and $P_{BB}$ is said bottom bounding pixel, and if true, using the value of said $P_{BB+1}$ for said expansion; else using the value of said $P_{BB}$ for said expansion.

25. A system with a plurality of stages for removing blocking artifacts from a picture, comprising:

a first stage that determines whether the difference in pixel values across a block boundary of a block decoded picture is not more than a predetermined level;

a second stage that is operative in response to determining that the difference in pixel values across the block boundary is not more than said predetermined level, determining, based on the content of the picture, the extent of a one-dimensional smooth set of pixels extending one or more pixels on each side of the boundary to filter, wherein determining the extent comprises iteratively checking pixels on each side of the block boundary to determine whether the pixel is to be included in the extent; and a third stage that determines, based on the extent of the set of pixels, a filter with length correlated with said extent with which to filter the pixels of the set.

26. The system of claim 25, wherein said determining that the difference in pixel values across the block boundary is not more than said predetermined level includes:

comparing the pixel values of the pixel duo of adjacent pixels that define the block boundary.

27. The system of claim 25, wherein said comparing the pixel values of the pixel duo of adjacent pixels that define the block boundary comprises determining whether the difference in amplitude of the pixels of the pixel duo is less than or equal to a constant times the quantization scale parameter.

28. The system of claim 25, wherein said determining the extent of the one-dimensional smooth set of pixels includes:

determining whether the set of pixels extends for one, two, three, or four contiguous pixels on one side of the boundary and independently determining whether the set of pixels extends for one, two, three, or four contiguous pixels on the other side of the boundary.

29. The system of claim 28, wherein said determining the extent of the one-dimensional smooth set of pixels includes using a grey scale comparison of adjacent pixels.

30. The system of claim 25, further comprising:

filtering the pixels of the set using the filter, wherein padding values are used for filter taps extending beyond the set.

31. The system of claim 25, further comprising a fourth stage that determines said padding values, wherein, for either side of the set, the padding values are determined by comparing the values of a first pixel and a second pixel, where the first pixel is the pixel adjacent to, but outside of, the set of pixels and the second pixel is the pixel inside the set that is adjacent to the first pixel.

32. The system of claim 25, wherein the boundary is at least one of a vertical boundary and a horizontal boundary.

33. The system of claim 25, wherein the picture is at least one of a moving picture or a still picture.

34. The system of claim 25, wherein said comparing the pixel values of the pixel duo of adjacent pixels that define the block boundary includes determining whether the difference in values of pixel duo is less than or equal to a value dependent on a quantization scale parameter.

35. A processor readable storage media that includes executable instructions for enabling actions to remove blocking artifacts from a picture, the actions comprising:

determining whether the difference in pixel values across a block boundary of a block decoded picture is not more than a predetermined level;

in response to determining that the difference in pixel values across the block boundary is not more than said predetermined level, determining, based on the content of the picture, the extent of a one-dimensional smooth set of pixels extending one or more pixels on each side of the boundary to filter, wherein determining the extent comprises iteratively checking pixels on each side of the block boundary to determine whether the pixel is to be included in the extent; and determining, based on the extent of the set of pixels, a filter with length correlated with said extent with which to filter the pixels of the set.

36. The processor readable storage media of claim 35, wherein said determining that the difference in pixel values across the block boundary is not more than said predetermined level includes:

comparing the pixel values of the pixel duo of adjacent pixels that define the block boundary.

37. The processor readable storage media of claim 35, wherein said comparing the pixel values of the pixel duo of adjacent pixels that define the block boundary comprises determining whether the difference in amplitude of the pixels of the pixel duo is less than or equal to a constant times the quantization scale parameter.

38. The processor readable storage media of claim 35, wherein said determining the extent of the one-dimensional smooth set of pixels includes:

determining whether the set of pixels extends for one, two, three, or four contiguous pixels on one side of the boundary and independently determining whether the set of pixels extends for one, two, three, or four contiguous pixels on the other side of the boundary.

39. The processor readable storage media of claim 35, wherein said determining the extent of the one-dimensional smooth set of pixels includes using a grey scale comparison of adjacent pixels.

40. The processor readable storage media of claim 35, further comprising:

filtering the pixels of the set using the filter, wherein padding values are used for filter taps extending beyond the set.

41. The processor readable storage media of claim 35, wherein the boundary is at least one of a vertical boundary and a horizontal boundary.

42. The processor readable storage media of claim 35, wherein the picture is at least one of a moving picture or a still picture.

43. The processor readable storage media of claim 35, wherein said comparing the pixel values of the pixel duo of adjacent pixels that define the block boundary includes determining whether the difference in values of pixel duo is less than or equal to a value dependent on a quantization scale parameter.

* * * * *